(12) United States Patent
Kaku (10) Patent No.: US 8,379,958 B2
(45) Date of Patent: Feb. 19, 2013

(54) IMAGE PROCESSING APPARATUS AND IMAGE PROCESSING METHOD

(75) Inventor: Toshihiko Kaku, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 1338 days.

(21) Appl. No.: 12/051,632

(22) Filed: Mar. 19, 2008

(65) Prior Publication Data

US 2008/0232692 A1 Sep. 25, 2008

(30) Foreign Application Priority Data

Mar. 20, 2007 (JP) ................................. 2007-073425

(51) Int. Cl.
*G06K 9/00* (2006.01)
(52) U.S. Cl. .......................... 382/132; 382/118; 382/165
(58) Field of Classification Search .................. 382/118, 382/165, 167, 190, 239, 264
See application file for complete search history.

(56) References Cited

U.S. PATENT DOCUMENTS

| | | | | |
|---|---|---|---|---|
| 6,529,630 B1 * | 3/2003 | Kinjo | ............................ | 382/190 |
| 6,665,446 B1 * | 12/2003 | Kato | ............................ | 382/251 |
| 6,766,056 B1 * | 7/2004 | Huang et al. | ................ | 382/190 |
| 6,826,316 B2 * | 11/2004 | Luo et al. | ..................... | 382/305 |
| 7,035,452 B2 * | 4/2006 | Akiyoshi et al. | ............... | 382/154 |
| 7,085,419 B2 * | 8/2006 | Akiyoshi et al. | ............... | 382/232 |
| 7,227,996 B2 * | 6/2007 | Imagawa et al. | .............. | 382/199 |
| 7,437,011 B2 * | 10/2008 | Kato | ............................ | 382/251 |
| 7,486,317 B2 * | 2/2009 | Kugo | ............................ | 348/251 |
| 7,580,560 B2 * | 8/2009 | Bryll | ............................ | 382/152 |
| 7,627,148 B2 * | 12/2009 | Kaku | ............................ | 382/118 |
| 7,636,478 B2 * | 12/2009 | Bryll | ............................ | 382/209 |
| 2004/0021779 A1 | 2/2004 | Yano | | |
| 2004/0071352 A1 * | 4/2004 | Mizoguchi et al. | ........... | 382/233 |
| 2004/0234135 A1 * | 11/2004 | Nomizu | ........................ | 382/209 |
| 2005/0276481 A1 * | 12/2005 | Enomoto | ...................... | 382/190 |
| 2005/0286793 A1 * | 12/2005 | Izumi et al. | ................... | 382/263 |
| 2006/0008145 A1 * | 1/2006 | Kaku | ............................ | 382/173 |
| 2006/0133654 A1 * | 6/2006 | Nakanishi et al. | ............ | 382/118 |
| 2006/0182348 A1 * | 8/2006 | Kinjo | ............................ | 382/203 |

(Continued)

FOREIGN PATENT DOCUMENTS

| | | |
|---|---|---|
| EP | 1612730 A1 | 1/2006 |
| JP | 200462651 A | 2/2004 |

(Continued)

*Primary Examiner* — Vu Le
*Assistant Examiner* — Aklilu Woldemariam
(74) *Attorney, Agent, or Firm* — Sughrue Mion, PLLC (57) ABSTRACT

The image processing apparatus comprises: an image correction unit which applies a correction processing to the digital image data; a subject detection unit which detects a human subject from an input image data; a skin color setting unit which sets skin color information based on the detected human subject; a skin color extraction unit which extracts pixels having a skin color similar to a skin color represented by the set skin color information from the digital image data; an area setting unit which sets mask information used to apply correction only to an area to be corrected; and an image output unit which produces output image data based on the inputted digital image data, the corrected image data and the mask information. In a case where the human subject is not detected, skin color information is set using the pre-defined skin color information.

8 Claims, 7 Drawing Sheets

U.S. PATENT DOCUMENTS

| | | | |
|---|---|---|---|
| 2006/0257047 A1* | 11/2006 | Kameyama et al. | 382/275 |
| 2006/0280363 A1* | 12/2006 | Umeda | 382/167 |
| 2007/0014467 A1* | 1/2007 | Bryll | 382/152 |
| 2007/0041640 A1 | 2/2007 | Tabata et al. | |
| 2008/0025616 A1* | 1/2008 | Bryll | 382/209 |
| 2009/0052786 A1* | 2/2009 | Gross et al. | 382/209 |

FOREIGN PATENT DOCUMENTS

| | | |
|---|---|---|
| JP | 2004303193 A | 10/2004 |
| JP | 200611685 A | 1/2006 |
| JP | 200618467 A | 1/2006 |
| WO | 2004084142 A1 | 9/2004 |

\* cited by examiner

IMAGE PROCESSING APPARATUS AND IMAGE PROCESSING METHOD

BACKGROUND OF THE INVENTION

1. Field of the Invention

The present invention relates to an image processing apparatus and image processing method, and more particularly to an image processing apparatus and image processing method for extracting a human subject from an image to apply image processings such as a beautiful-skin processing to the human subject.

2. Description of the Related Art

In human photography, since a face is the most noticeable portion, the face of a person must be properly reproduced in the output image. Thus, there have been made various proposals for applying image processings (image corrections) such as a beautiful-skin processing to an image including a human subject and thereby reproducing the skin of the human subject so that it looks beautiful.

For example, there is known an image processing apparatus which automatically identifies an area to be processed for image correction, e.g., a human image area in the image including a human image and applies image correction processing such as a blurring processing only to the specified area, so that the area including the background is prevented from blurring in the human image blurring processing (for example, refer to Japanese Patent Application Laid-Open No. 2004-303193).

Also, for example, there is known a picture image processing apparatus which detects a human face area from inputted original image data, extracts skin information corresponding to the detected face area, detects a skin area based on the extracted skin information, and applies a sharpening processing or a granularity suppressing processing to the detected skin area (for example, refer to Japanese Patent Application Laid-Open No. 2006-11685).

Also, for example, there is known an image processing apparatus which includes: a determination device which extracts areas of a face and its organs from an image to be processed and determines a removal processing area obtained by removing the organ areas from the extracted face area; a detection device which detects an image to be removed in the removal processing area; and a removal device which updates the values of pixels of the image to be removed, based on the values of pixels around the image to be removed and thereby removes the image to be removed, whereby image portions such as moles and pigmented spots are automatically removed without causing image quality degradation in the image of the face organs (for example, refer to Japanese Patent Application Laid-Open No. 2006-18467).

Also, for example, there is known an image processing apparatus which includes: an image acquisition device which acquires image data from a recording medium having recorded thereon image data; a face area extraction device which extracts a human face area from the image data acquired by the image acquisition device; an image feature quantity calculation device which calculates an image feature quantity of the face area extracted from the image data by the face area extraction device; a correction effect presumption device which presumes whether or not a correction effect is achieved when the characteristics of the image data is corrected based on the image feature quantity calculated by the image feature quantity calculation device, and outputs a first presumption result; and an image correction device which, when the correction effect presumption device presumes, as a result of the first presumption, that a correction effect is achieved, corrects the characteristics of the image data based on the image feature quantity and outputs the corrected image data, whereby the image data is automatically corrected to output the human image having optimum characteristics (for example, Japanese Patent Application Laid-Open No. 2004-62651).

However, according to the above conventional art, when the processing such as the area detection fails in the middle of the image correction processing, a proper processing corresponding to the failure may not be performed.

There is also a problem that it is difficult to properly perform a processing such as modification of correction degree depending on the position of a human subject in an image.

SUMMARY OF THE INVENTION

The present invention has been achieved in view of the above circumstances, and has an object to provide an image processing apparatus and image processing method which can implement a less defective and more natural beautiful-skin processing even when a failure occurs in the middle of the processing, and the outputting is possible in a format by which modification can be easily performed.

To achieve the above object, according to a first aspect of the present invention, there is provided an image processing apparatus which includes: an image input unit via which digital image data is inputted; an image correction unit which applies a correction processing to the digital image data; a subject detection unit which detects a specific human subject from the digital image data; a skin color setting unit which sets skin color information based on the detected human subject; a skin color information read unit which reads pre-defined skin color information; a skin color extraction unit which extracts based on the set skin color information, pixels having a skin color similar to a skin color represented by the skin color information from the digital image data; an area setting unit which puts together the extracted skin color pixels as an area to be corrected on a per area basis, sets a parameter and sets mask information used to apply correction only to the area to be corrected; and an image output unit which produces output image data based on the inputted digital image data, the corrected image data and the mask information, wherein in a case where while there is a captured human subject in the inputted digital image data, the human subject is not detected, skin color information is set using the pre-defined skin color information.

Accordingly, even when a processing failure occurs in the middle of the image processing, a proper processing can be performed, allowing performing a less defective and more natural beautiful-skin correction processing.

According to a second aspect of the present invention, there is provided the image processing apparatus of the first aspect, further including: a device which compares the skin color information being set based on the detected human subject with the pre-defined skin color information and determines whether or not the skin color information being set based on the detected human subject falls into a predetermined range of the pre-defined skin color information, wherein when the skin color information being set based on the detected human subject does not fall into the predetermined range of the pre-defined skin color information, the skin color information being set based on the detected human subject is discarded.

Accordingly, for example, when a subject being not the face of a human subject is detected as a face, an improper correction processing ascribable to the failure can be prevented.

According to a third aspect of the present invention, there is provided the image processing apparatus of the first or second aspect, further including a correction degree setting unit which sets a degree in which a correction is applied, wherein the degree of the correction is varied according to the position of an image to which the correction processing is applied.

Accordingly, the degree of correction can be properly varied according to the subject or its position in the image.

In order to achieve the above object, according to a fourth aspect of the present invention, there is provided an image processing method which includes the steps of: inputting digital image data; applying a correction processing to the digital image data; detecting a specific human subject from the digital image data; setting skin information based on the detected human subject; reading pre-defined skin color information; extracting based on the set skin color information, pixels having a skin color similar to a skin color represented by the skin color information from the digital image data; putting together the extracted skin color pixels as an area to be corrected on a per area basis and setting a parameter and setting mask information used to apply correction only to the area to be corrected; and producing output image data based on the inputted digital image data, the corrected image data and the mask information, wherein in a case where while there is a captured human subject in the inputted digital image data, the human subject is not detected, skin color information is set using the pre-defined skin color information.

Accordingly, even when a processing failure occurs in the middle of the image processing, a proper processing can be performed, allowing performing a less defective and more natural beautiful-skin correction processing.

According to a fifth aspect of the present invention, there is provided the image processing method of the fourth aspect, further including a step of comparing the skin color information being set based on the detected human subject with the pre-defined skin color information and determining whether or not the skin color information being set based on the detected human subject falls into a predetermined range of the pre-defined skin color information, wherein when the skin color information being set based on the detected human subject does not fall into a predetermined range of the pre-defined skin color information, the skin color information being set based on the detected human subject is discarded.

Accordingly, for example, when a subject being not the face of a human subject is detected as a face, an improper correction processing ascribable to the failure can be prevented.

According to a sixth aspect of the present invention, there is provided the image processing method of the fourth or fifth aspect, further including a step of setting a degree in which a correction is applied, wherein the degree of the correction is varied according to the position of an image to which the correction processing is applied.

Accordingly, the degree of correction can be properly varied according to the subject or its position in the image.

As described above, according to the present invention, even when a processing failure occurs in the middle of the image processing, a proper processing can be performed, allowing performing a less defective and more natural beautiful-skin correction processing.

DETAILED DESCRIPTION OF THE PREFERRED EMBODIMENTS

An image processing apparatus and image processing method according to the present invention will be described in detail below with reference to the accompanying drawings.

Figure 1:
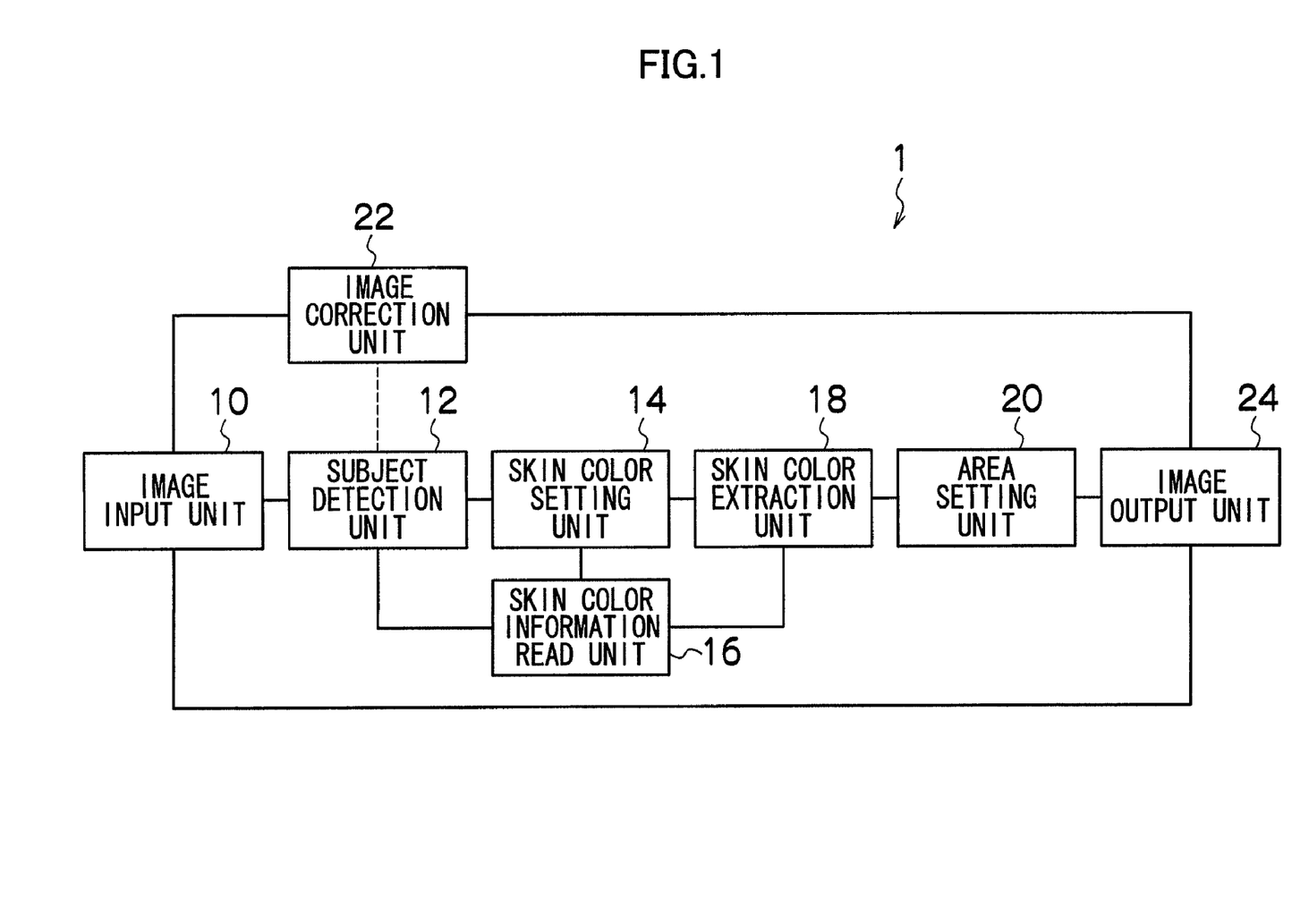
FIG. 1 is a block diagram illustrating a schematic configuration of an embodiment of an image processing apparatus according to the present invention.

FIG. 1 is a block diagram illustrating a schematic configuration of an embodiment of an image processing apparatus according to the present invention.

As illustrated in FIG. 1, an image processing apparatus 1 according to the present embodiment includes an image input unit 10, a subject detection unit 12, a skin color setting unit 14, a skin color information read unit 16, a skin color extraction unit 18, an area setting unit 20, an image correction unit 22 and an image output unit 24.

The image input unit 10 is for inputting digital image data such as an image captured by a digital camera or an image read by a scanner. The digital image data inputted via the image input unit 10 is sent to the subject detection unit 12, the image correction unit 22 and the image output unit 24.

The subject detection unit 12 performs a face detection processing which detects the face of a human subject in an image represented by the inputted digital image data, or a face part detection processing which detects face parts such as the eyes, eyebrows, nose and mouth in the face. An exemplary face detection technique is as follows. First, an image represented by colors of R, G and B is converted into an image represented by H (hue level), L (lightness level) and S (saturation level), and then two-dimensional histograms of hue and saturation levels are calculated using a coordinate system composed of a hue level axis, saturation level axis and pixel count axis orthogonal to each other. The calculated two-dimensional histograms are divided on a per mountain (mountain shaped cluster) basis to perform clustering of the two-dimensional histograms. Many pixels are clustered based on the mountains of the two-dimensional histogram obtained by the above clustering, and based on this clustering, the image is divided into areas and an area being a candidate for a human face is extracted from among the divided areas. This color area extracted as a candidate for a face is further divided into circular or oblong areas, so that a face area is determined based on these divided areas.

The face detection can be automatically performed in this manner; alternatively, a face area may be extracted by the operator using input devices such as a mouse and keyboard to specify a face area of a human subject in the image displayed on a display screen.

The skin color setting unit 14 extracts skin color pixels with high reliability, using histograms of hue, saturation and lightness for the face area detected by the subject detection unit 12, and uses them for skin color setting.

The skin color information read unit 16 reads pre-defined skin color information stored in a memory and supplies the information to the skin color setting unit 14. For example, when the subject detection unit 12 cannot detect a subject (when the face detection fails), the skin color information read unit 16 reads pre-defined skin color information stored in a memory and supplies the information to the skin color setting unit 14, so that the skin color setting unit 14 performs skin color setting based on this skin color information.

When a piece of information obtained by integrating information on various skin colors is defined and stored as the pre-defined skin color information, such information is automatically read by the skin color information read unit 16. Also, when multiple sets of information on various skin colors dependent on sexuality, age, ethnic group and the like are defined and stored, the operator may specify from among the multiple sets of information, so that the skin color information read unit 16 reads the specified one. Further, for example, in a large film laboratory, many similar images are often processed and thus similar image processings may be performed for images around the currently processed image. In this case, instead of reading such pre-defined skin color information, the skin color setting unit 14 may automatically read the skin color used in the adjacent images to use it for skin color setting.

As described above, the skin color information read unit 16 reads the skin color when the subject detection unit 12 fails to detect a subject. Further, even when the subject detection unit 12 detects a subject, the skin color information read unit 16 may read the pre-defined skin color information stored in a memory to supply it to the skin color setting unit 14.

In this case, the skin color setting unit 14 compares the skin color being set based on the detected subject with the skin color information read by the skin color information read unit 16, and determines whether or not the skin color of the detected subject falls into a predetermined range of the skin color information read by the skin color information read unit 16, whereby a subject detection error is checked. More specifically, when the skin color of the detected subject does not fall into the predetermined range of the skin color information read by the skin color information read unit 16, it is determined that this subject is actually not a human subject, but erroneously detected as a human subject; consequently, the skin color information being set based on this subject is discarded, and this subject is not treated as a human subject, and the processing for the subject is stopped.

The skin color extraction unit 18 extracts based on the skin color being set by the skin color setting unit 14, pixels of a skin color similar to the set skin color from an image, and thereby extracts a skin color area in the human subject.

As a technique of extracting a skin color area, for example, there is known, but not limited to, a technique by which the hue, saturation and lightness of a predetermined area adjacent to the pixels having the set skin color are checked, and areas satisfying predetermined conditions are added as a skin color area to grow the skin color area and further, outline extraction and the like for this grown skin color area are performed to further grow this area; this processing is repeated until there remains no adjacent pixel to be grown, or until the number of times of repeating this processing reaches a predetermined value, whereby skin color area extraction is performed.

When two or more subjects (two or more human subjects) are detected by the subject detection unit 12, a skin color obtained by combining these two skin colors may be set as the skin color, so that the skin color extraction unit 18 extracts skin color pixels. Alternatively, each of the two skin colors may be separately set as the skin color, so that the skin color extraction unit 18 extracts skin color pixels based on the respective skin colors.

Also, when two or more subjects (two or more human subjects) are detected by the subject detection unit 12, labeling may be performed to indicate respective skin color areas corresponding to each subject. This labeling may be determined based on the similarity of skin color. That is, the labeling may be made based on to which of skin colors the subject is most similar. Or, the skin color close to the position of the subject may be labeled.

The area setting unit 20 sets the extracted skin color area as an area to be corrected. The area setting unit 20 also produces a mask image used to obtain an image in which the correction is applied only to the area to be corrected by multiplying the mask image by an overall corrected image to be described later in which the entire image including the subject has been corrected.

In the area setting unit 20, segmentation or labeling may be applied to the extracted skin color area. Also, in the area setting unit 20, an adjustment may be applied to the extracted skin color area so that the shape of the area looks like skin. For example, white-saturated pixels (blown-out highlights) caused by strobe photography or the like may be corrected.

The image correction unit 22 performs a beautiful-skin processing, smoothing or noise suppression processing. More specifically, the image correction unit 22 calculates, based on a difference between a target correction value to be reached after correcting the area to be corrected, e.g., a predetermined lightness and an average value or intermediate value of lightness in the area to be corrected, a correction quantity (correction degree for each predetermined component of the image) determined proper as a correction quantity used to correct the area to be corrected, and then uses this as an initial value to correct the entire image including the human subject.

The image output unit 24 combines the input image, corrected image and mask image to produce and output an output image. More specifically, the image output unit 24 combines, for each corresponding pixel, based on a predetermined weight represented by the mask image, the overall corrected image obtained through the image correction unit 22 with the original input image including the human subject sent from the image input unit 10, and thereby produces a corrected image in which only the area to be corrected has been corrected. Here, the overall corrected image contains a beautiful-skin processing; the weight represented by the mask image contains beautiful-skin degree information.

Figure 2:
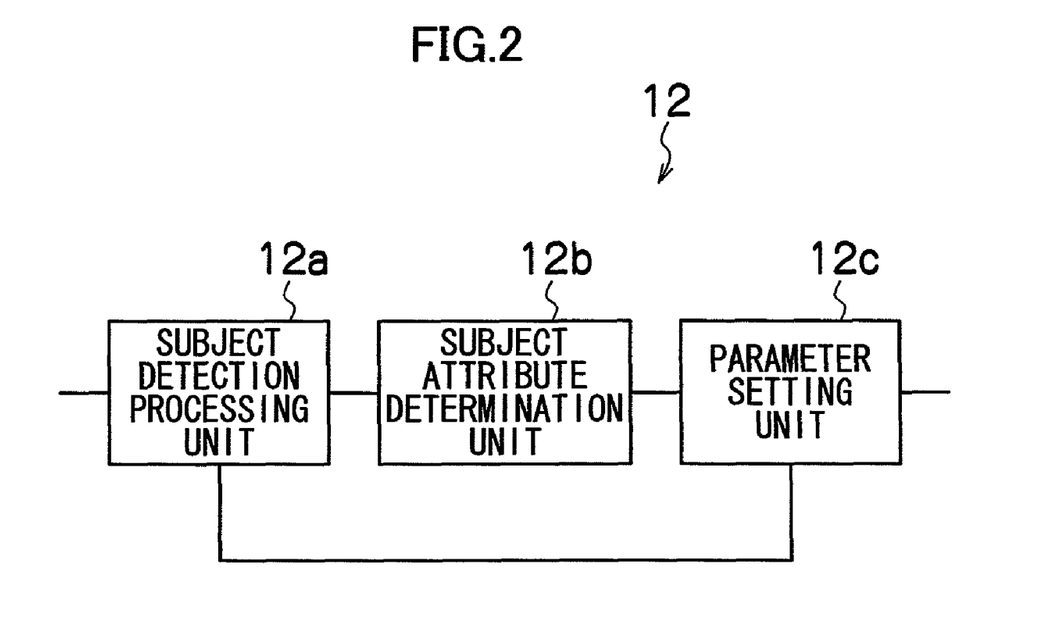
FIG. 2 is a block diagram illustrating a detailed configuration of a subject detection unit.

FIG. 2 illustrates a detailed configuration of the subject detection unit 12.

As illustrated in FIG. 2, the subject detection unit 12 includes a subject detection processing unit 12a, subject attribute determination unit 12b and parameter setting unit 12c.

The subject detection processing unit 12a actually detects the face of a human subject from an input image, or detects face parts such as eyes, eyelids, nose and mouth in the face. The subject attribute determination unit 12b determines sexuality, generation (age), ethnic group, face direction and the like of the detected human subject, and further may identify an individual using a person authentication technique.

The parameter setting unit 12c sets correction parameters according to the detected human subject. The correction parameters include, for example, beautiful-skin processing degree (for example, while a larger degree of beautiful-skin processing is applied to the face and its vicinities, a smaller degree of beautiful-skin processing is applied to the other parts), the ratio of correction degree between facial skin and non-facial skin, the range of pixel value (for example, 128 to 230 of sRGB) in which the beautiful-skin correction is applied, and frequency at which suppression is performed.

In this way, the beautiful-skin processing degree can be varied according to the position in the image. For example, there may be a case where, while a larger degree of beautiful-skin correction is to be applied to the face skin, no beautiful-skin correction is to be applied to areas other than the face, or a case where a smaller degree of beautiful-skin correction is to be applied to the skin of the arms or the like, compared to the face skin, or a case where no beautiful-skin correction is to be applied to the eyes, bangs, ears and the like. Such information on the correction degree dependent on the position may be saved as the mask information in the area setting unit 20.

Also, the parameter setting unit 12c may set, according to the position or size of the detected human subject or the subject attributes, the correction parameters used in the correction by the image correction unit 22. For example, the parameters may be adjusted according to the face size so that the visual quality does not vary, or a larger degree of beautiful-skin correction may be applied to a face at the center of the screen because it is highly likely that the face is the main subject, or a larger degree of beautiful-skin correction is applied to an aged human subject, or no beautiful-skin correction is applied to male and child subjects.

Also, the parameter setting unit 12c may set the correction parameters based on the person authentication result. For example, when a person to which a correction processing has already been applied is authenticated, there may be set the same parameters as those used in the previous correction processing. In this case, when the correction parameters and the like corresponding to the authentication result are preliminarily saved, the correction parameter setting does not need to be additionally performed, thus allowing implementing an efficient processing. Also, the image correction unit 22 may perform the image correction according to the correction parameters being set by the parameter setting unit 12c.

Figure 3:
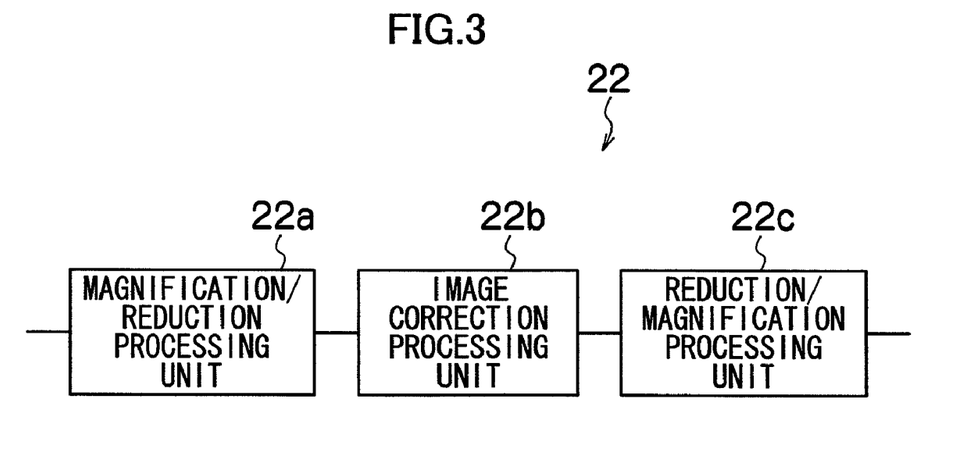
FIG. 3 is a block diagram illustrating a detailed configuration of an image correction unit.

FIG. 3 illustrates a detailed configuration of the image correction unit 22. As illustrated in FIG. 3, the image correction unit 22 includes a magnification/reduction processing unit 22a, image correction processing unit 22b and reduction/magnification processing unit 22c.

In this way, the magnification/reduction processing unit 22a and reduction/magnification processing unit 22c are arranged in the preceding and rear stages of the image correction processing unit 22b which actually performs an image correction processing, so that the processing can be applied according to the size of the subject detected by the subject detection unit 12.

More specifically, for example, when the size of the subject is small, the subject image is magnified by the magnification/reduction processing unit 22a, and then the image correction processing unit 22b applies an image correction to this magnified subject image, and thereafter the reduction/magnification processing unit 22c applies a reduction processing to the corrected image.

Figure 4:
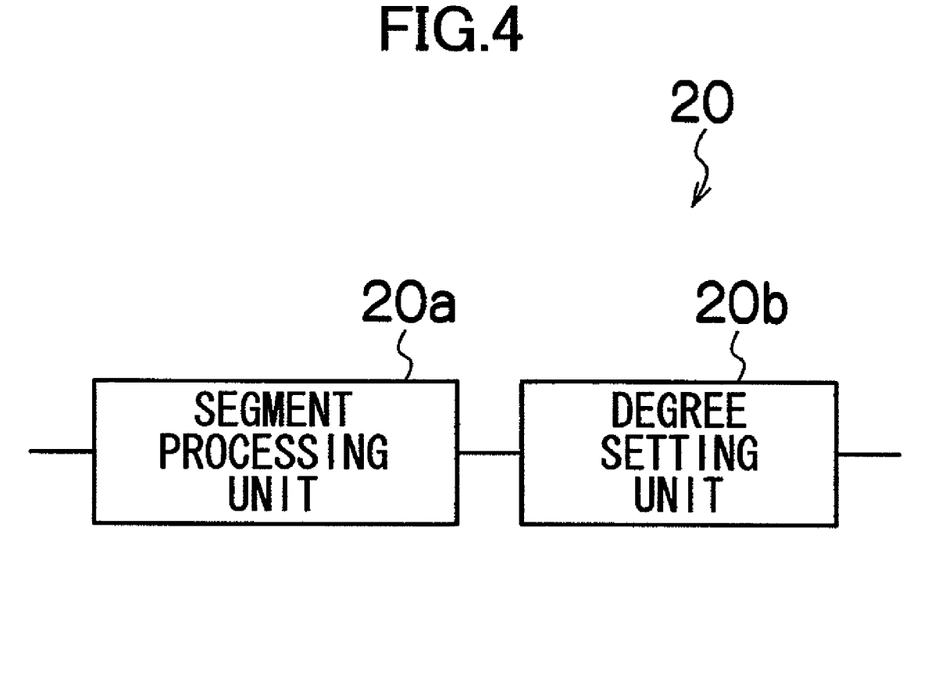
FIG. 4 is a block diagram illustrating a detailed configuration of an area setting unit.

FIG. 4 illustrates a detailed configuration of the area setting unit 20. As illustrated in FIG. 4, the area setting unit 20 includes a segment processing unit 20a and degree setting unit 20b.

The segment processing unit 20a applies a segment processing to the skin color area extracted by the skin color extraction unit 18. The degree setting unit 20b sets the degree of beautiful-skin correction based on, for example, the subject detection result or subject attribute determination result. This beautiful-skin correction degree (beautiful-skin degree) may be provided as the mask information. In this case, the image correction unit 22 may perform correction processing using the fixed correction parameters.

As described above, the image output unit 24 combines an input image sent from the image input unit 10, a corrected image (beautiful-skin processed image) sent from the image correction unit 22 and a mask image including beautiful-skin degree information, and produces and outputs an output image. In this case, the image output unit 24 may save the input image, beautiful-skin processed image and beautiful-skin degree image by a layered structure, and output them.

Also, the image output unit 24 may simultaneously output the detection result by the subject detection unit 12. Particularly, when no subject can be detected, this fact may be notified. For example, a specific character string may be inserted in a part of the file name, or in the layer name.

In this way, the overall corrected image in which the entire image containing the human subject has been corrected, and the input image are combined according to a predetermined weight for each corresponding pixel by use of the mask image to produce a combined image, whereby there can be obtained an image in which the correction has been applied only to the subject to be corrected.

The mask image has an image size (resolution) identical to that of the input image including the human subject, and each pixel of the mask image has a pixel value corresponding to a weight of 0 to 1 which corresponds to the degree of correction to be applied to the pixel. Here, a weight of "0" indicates that the degree of correction is 0%; a weight of "1" indicates that the degree of correction is 100%. Here, in order to prevent the partially corrected image (the image which is corrected in only the area to be corrected) which is finally obtained by combining the input image including the human subject, the overall corrected image and the mask image from looking unnatural, a mask blurring processing is performed.

More specifically, the pixel value (weight) of the mask image is set in the boundary and its vicinities of the area to be corrected in the mask image so that the correction degree decreases in a direction from the inside of the area to be corrected toward the outside thereof. As the weight used to blur the mask in this manner, there is known the $\alpha$ channel which represents the transparency.

This $\alpha$ channel is a channel used to define the transparency in a given pixel in the image; the combining ratio between the image to be combined and the template is varied according to the value of the $\alpha$ channel. More specifically, as the value of the $\alpha$ channel is smaller, the template image can be seen more clearly. For example, when the value of the $\alpha$ channel in the boundary and its vicinities between the image to be combined and the template is set smaller, the image to be combined and the template are combined so that the image to be combined looks to be melted into the template. Consequently, when the transparency is defined by the $\alpha$ channel, the image to be used for the combining can be melted into the template, thus allowing combining the template and image more naturally.

With the present embodiment, also, the beautiful-skin degree information may be set using the $\alpha$ channel.

The image processing method being the operation of the present embodiment will be described below with reference to the flowcharts of FIGS. 5 to 7.

Figure 5:
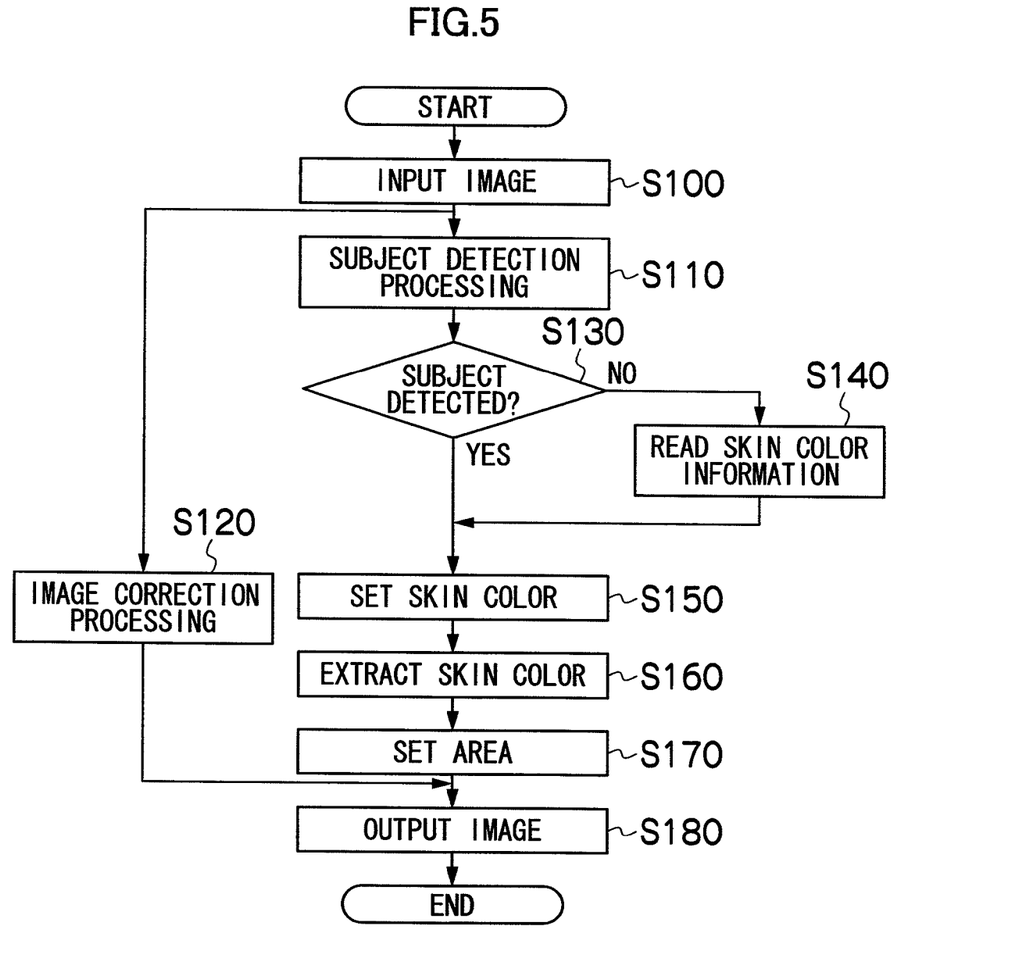
FIG. 5 is a flowchart illustrating the whole image processing procedure.

FIG. 5 is a flowchart illustrating the whole image processing procedure; FIG. 6 is a flowchart particularly illustrating details of the skin color setting-related section; FIG. 7 is a flowchart particularly illustrating details of the area setting-related section.

First, in step S100 of FIG. 5, when image data is inputted via the image input unit 10, the input image is sent to the subject detection unit 12 and image correction unit 22.

Then, in step S110, the subject detection unit 12 detects a human subject from the input image. Also, in step S120, the image correction unit 22 applies an image correction processing to the whole input image.

As described above, the subject detection unit 12 detects a human subject and its face, or face parts and the like from the input image.

Subsequently, in step S130, it is determined whether or not the subject detection unit 12 has detected a subject; if it is determined that a subject has not been detected, the operation proceeds to step S140, in which the skin color information read unit 16 reads pre-defined skin color information. The read skin color information is sent to the skin color setting unit 14.

In step S150, when a subject has been detected, the skin color setting unit 14 performs skin color setting using the pixels of the face part of the detected human subject. Here, when no subject has been detected, a skin color is set based on the skin color information read by the skin color information read unit 16.

Subsequently, in step S160, the skin color extraction unit 18 extracts skin color pixels from the whole image by use of the set skin color. Subsequently, in step S170, the area setting unit 20 puts together the extracted skin color pixels and sets them as a skin color area to be corrected. Also, the area setting unit 20 produces, as described above, a mask image (mask information) which causes only the set skin color area to be corrected.

Subsequently, in step S180, the image output unit 24 combines the image corrected by the image correction unit 22, the input image and the mask image, whereby there is produced a corrected image in which only the area to be corrected has been corrected.

Figure 6:
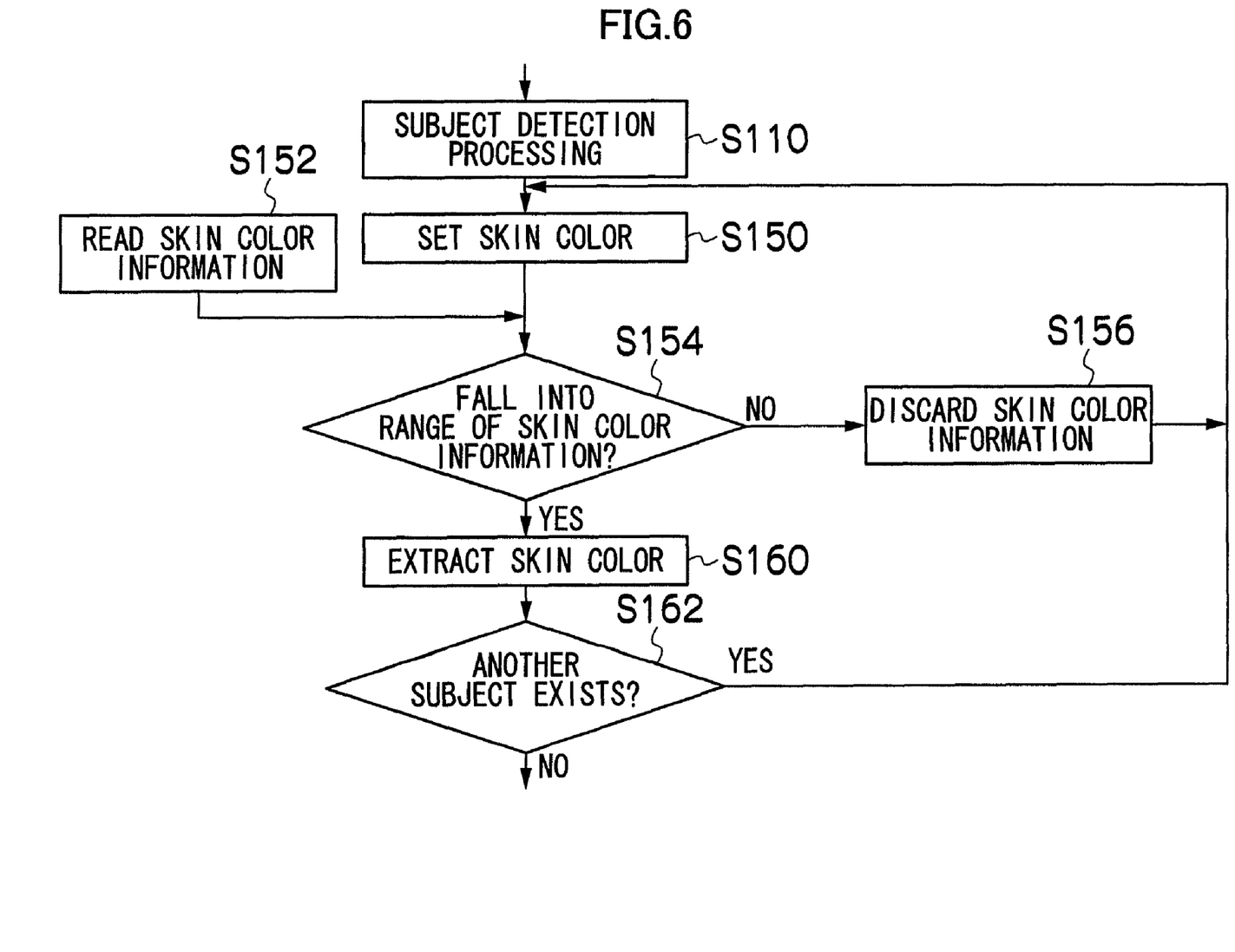
FIG. 6 is a flowchart illustrating details of a skin color setting-related section.

FIG. 6 is a flowchart particularly illustrating details of the skin color setting-related section. The processing illustrated in FIG. 6 relates to a face detection error; such processing may be performed in addition to the whole procedure of FIG. 5.

More specifically, face detection errors include a case where a face captured in the image cannot be detected and a case where a non-face part in the image is detected as a face. When a non-face part is detected as a face, an improper skin color may be set, causing an unexpected correction. Thus, in order to prevent this, in the flowchart illustrated in FIG. 6, even when a subject has been detected, the skin color information is read.

More specifically, in step S110, the subject detection is performed, and after a subject is detected (in FIG. 6, steps S130 and S140 being omitted), the skin color setting unit 14 performs skin color setting in step S150. However, in FIG. 6, in step S152, (even when a subject has been detected), the skin color information read unit 16 reads pre-defined skin color information, and the detected subject skin color is compared with the pre-defined skin color.

In step S154, when the detected subject skin color does not fall into the range of the pre-defined skin color information, the detected subject skin color information is discarded in step S156, so that the subject face detection result is not used.

On the other hand, in step S154, when the detected subject skin color falls into the range of the pre-defined skin color information, this skin color is set as the skin color, and the skin color extraction is performed using the skin color in step S160. Subsequently, in step S162, it is determined whether or not another subject has been detected; if it is determined that another subject has been detected, the operation returns to step S150, and the above processings are repeated; if it is determined that there is no subject left, the operation proceeds to step S170 of FIG. 5, in which the subsequent area setting is performed.

Figure 7:
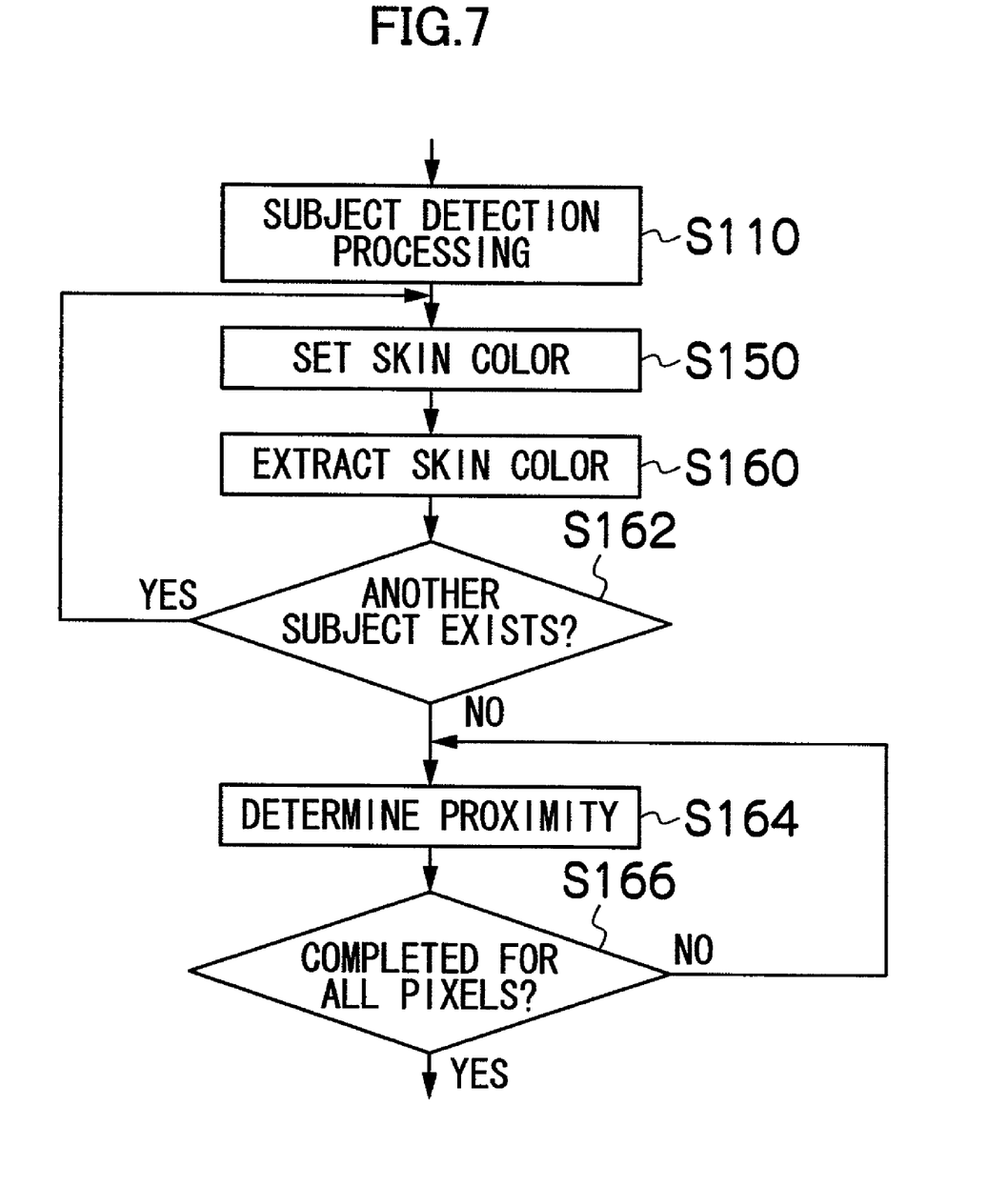
FIG. 7 is a flowchart illustrating details of an area setting-related section.

The flowchart illustrated in FIG. 7 relates to an area setting. In the processing illustrated in FIG. 7, there is described an example in which the images of two persons are captured and the two human subjects are detected. Similarly to the processing of FIG. 6, such processing may be performed in addition to the whole procedure of FIG. 5.

In step S110 of FIG. 7, firstly the skin color setting (step S150) and the skin color extraction (step S160) are performed for one person. In step S162, it is determined whether or not another subject has been detected; if it is determined that another subject has been detected, the operation returns to S150, so that the skin color setting (step S150) and the skin color extraction (step S160) are also performed for the other subject.

In this way, when two human subjects are detected, the skin colors are different from each other, so the skin color setting (step S150) and the skin color extraction (step S160) are performed for each subject.

Subsequently, in step S164, skin colors produced for each subject are compared to perform proximity determination. When it is determined based on pre-defined conditions for proximity determination that the skin colors are proximate to each other, the skin colors may be put together as one skin color, or when there are two or more subjects, the pixel information of one proximate skin color may be joined to that of the other proximate skin color. In step S166, it is determined whether or not the proximity determination has been completed for all pixels; the proximity determination is repeated until it is completed for all the pixels.

According to the present embodiment, even when a processing failure occurs in the middle of the subject detection and the like, a proper processing can be performed to cope with the failure, and also a proper processing can be performed depending on the subject and its position in the image. Consequently, a less defective and more natural beautiful-skin processing and other correction processings can be implemented. Also, the input image, beautiful-skin processing image and beautiful-skin degree information (mask image) can be saved and outputted in a format by which the correction can be easily made, for example, by a layered structure.

The image processing apparatus and image processing method according to the present invention was described in detail above. However, the present invention is not limited to the above described example; it is to be understood that various modifications and variations are possible without departing from the gist of the invention.

What is claimed is:
1. An image processing apparatus comprising:
an image input unit via which digital image data is inputted;
an image correction unit which applies a correction processing to the digital image data;
a subject detection unit which detects a specific human subject from the digital image data;
a skin color setting unit which sets skin color information based on the detected human subject;
a skin color information read unit which reads pre-defined skin color information;
a skin color extraction unit which extracts based on the set skin color information, pixels having a skin color similar to a skin color represented by the skin color information from the digital image data;

an area setting unit which puts together the extracted skin color pixels as an area to be corrected on a per area basis, sets a parameter for degree of beautiful-skin correction based on the human subject detection result and sets mask information used to apply a correction only to the area to be corrected; and an image output unit which produces output image data based on the inputted digital image data, the corrected image data and the mask information, said mask information including a boundary and an inner portion, wherein the degree of correction decreases in a direction from the inner portion to the boundary, a determining unit which determines that the human subject was not detected from the inputted digital image data; and a skin color setting unit which sets skin color information using the predetermined skin color information in a case where while there is a captured human subject in the inputted digital image data, the human subject is not detected by the determining unit.

2. The image processing apparatus according to claim 1, further comprising a device which compares the skin color information being set based on the detected human subject with the pre-defined skin color information and determines whether or not the skin color information being set based on the detected human subject falls into a predetermined range of the pre-defined skin color information, and a device which discards the skin color information set based on the detected human subject when the determining unit determines that the skin color information set based on the detected human subject does not fall into the predetermined range of the pre-defined skin color information.

3. The image processing apparatus according to claim 1, further comprising a correction degree setting unit which sets a degree in which a correction is applied, wherein the degree of the correction is varied according to the position of an image to which the correction processing is applied.

4. The image processing apparatus according to claim 2, further comprising a correction degree setting unit which sets a degree in which a correction is applied, wherein the degree of the correction is varied according to the position of an image to which the correction processing is applied.

5. An image processing method comprising the steps executed by a computer, said method comprising:

inputting digital image data;

applying a correction processing to the digital image data;

detecting a specific human subject from the digital image data;

setting skin information based on the detected human subject;

reading pre-defined skin color information;

extracting based on the set skin color information, pixels having a skin color similar to a skin color represented by the skin color information from the digital image data;

putting together the extracted skin color pixels as an area to be corrected on a per area basis, setting a parameter for degree of beautiful-skin correction based on the human subject detection result and setting mask information used to apply a correction only to the area to be corrected;

producing output image data based on the inputted digital image data, the corrected image data and the mask information, said mask information including a boundary and an inner portion, wherein the degree of correction decreases in a direction from the inner portion to the boundary, and determining that the human subject was not detected from the inputted digital image data, wherein in a case where while there is a captured human subject in the inputted digital image data, the human subject is not detected, skin color information is set using the pre-defined skin color information.

6. The image processing method according to claim 5, further comprising a step of comparing the skin color information being set based on the detected human subject with the pre-defined skin color information and determining whether or not the skin color information being set based on the detected human subject falls into a predetermined range of the pre-defined skin color information, and discarding the skin color information set based on the detected human subject when the skin color information set based on the detected human subject does not fall into the predetermined range of the pre-defined skin color information.

7. The image processing method according to claim 5, further comprising a step of setting a degree in which a correction is applied, wherein the degree of the correction is varied according to the position of an image to which the correction processing is applied.

8. The image processing method according to claim 6, further comprising a step of setting a degree in which a correction is applied, wherein the degree of the correction is varied according to the position of an image to which the correction processing is applied.

* * * * *